UNITED STATES PATENT OFFICE.

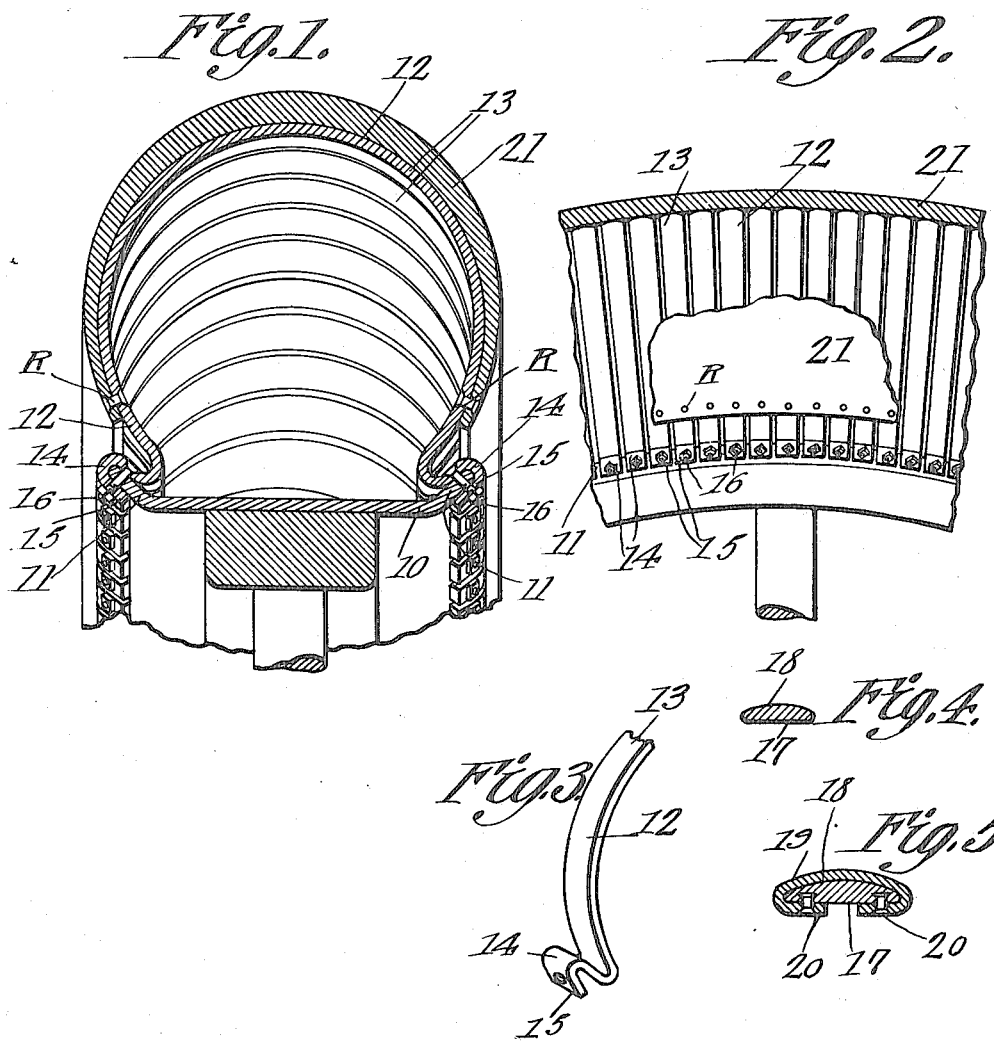

JABEZ M. SMITH, OF MALVERN, ARKANSAS.

VEHICLE-TIRE.

1,136,285.  Specification of Letters Patent.  Patented Apr. 20, 1915.

Application filed July 23, 1914. Serial No. 852,745.

*To all whom it may concern:*

Be it known that I, JABEZ M. SMITH, a citizen of the United States, residing at Malvern, in the county of Hot Springs and State of Arkansas, have invented a new and useful Vehicle-Tire, of which the following is a specification.

This invention relates to improvements in vehicle tires and particularly to that type of tire utilizing a plurality of spring convolutions whereby the desired resiliency is obtained.

One of the objects of the present invention is to provide an improved means for securing the separate springs to the rim so that they may be quickly attached or detached, as desired.

A further object is to fashion the springs of such cross sectional contour that they will possess the desired resiliency, the construction being such that the springs may be used in connection with a shoe or may contact directly with the road.

A further object is to provide a tire embodying separate and distinct spring loops over which extends a shoe, which shoe may be easily and quickly secured to the spring loops and be readily detached therefrom to facilitate the repairing of one or a number of the loops.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated.

In said drawings: Figure 1 is a view in cross section of a wheel rim with my improved tire secured thereto. Fig. 2 is a side elevation of the foregoing with a portion of the outer casing removed, in order to disclose the spring elements. Fig. 3 is a fragmental perspective of one of the spring loops. Figs. 4 and 5 are transverse sectional views of a spring element, the latter figure disclosing the spring element as provided with a casing riveted thereto.

Referring to the drawings in which similar reference numerals designate corresponding parts throughout the several views, the structure depicted in Fig. 1 includes a rim 10 provided at its edges with outwardly extending flanges 11, the same being inclined one with respect to the other at an angle of substantially 90 degrees and thus defining with the rim 10 an angle of substantially 135 degrees.

The tire is made up of a plurality of separate loops 12, each loop including a circular portion 13 extending through substantially three quadrants and therefore being triquadrantalar, and provided at its extremities with attaching portions 14. The attaching portions 14 are substantially S-shape with the lower bend 15 thereof receiving the outstanding flanges 11 of the rim. Suitable bolts 16 extend through the flanges 11 and through two adjacent portions of the loop and thus rigidly secure, by means of a single bolt, the one side of the loop and hold it against a pivotal motion.

The cross sectional contour of the spring loop 12 is disclosed in Figs. 4 and 5 and is defined by a plane lower wall 17 and the curved outer portion 18. A casing 19 may encompass the spring and when such is the case the part 19 is secured to the spring by rivets 20. An outer shoe 21 may be secured by rivets R to the spring loops, as disclosed in Figs. 1 and 2. In any case the shoe may be detached from the spring loops, allowing the latter to be replaced, thus permitting the tire to be repaired from time to time.

It is to be observed that the device herein disclosed comprises a rim 10 having inclined flanges 11; a curved spring element 12 comprising a body the lateral portions of which are bent to form S-shaped flange receiving hooks 14 defining upper and lower walls, the upper wall lying against the upper face of one flange 11 and the lower wall of the hook lying against the lower face of the said flange; and a securing element represented by the bolt 16, the bolt 16 passing through both walls of the hook, the bolt having a head which engages the inner wall of the hook. Mounted upon the bolt is a movable means, represented by a nut, which nut engages the outer wall of the hook. The bolt 16 is of greater length than the distance between the lower face of the upper wall of the hook and the body of the spring, whereby the bolt may remain engaged with the flange when the nut is detached. The spring element 12 is yieldable to permit the insertion of the bolt through the walls of the hook and through the flange.

Having thus fully described my invention, what I claim is:—

1. In a device of the class described, a rim having inclined flanges; a curved spring element the lateral portions of which are bent to form S-shaped flange engaging hooks defining spaced walls, one of which walls lies against the upper face of one flange, another of which walls lies against the lower face of said flange; and a securing element passing through the flange and engaging both of said walls of the hook to clamp the same on the flange.

2. In a device of the class described, a rim having inclined flanges; a curved spring element comprising a body the lateral portions of which are bent to form S-shaped flange receiving hooks defining upper and lower walls, the upper wall of the hook lying against the upper face of one flange and the lower wall of the hook lying against the lower face of said flange; and a securing element passing through the flange and through both walls of the hook, said securing element having a head which engages the inner wall of the hook; and movable means on the securing element for engaging the outer wall of the hook; the securing element being of greater length than the distance between the lower face of the upper wall of the hook and the body of the spring, whereby the securing element may remain engaged with the flange when said movable means is detached; the spring element being yieldable to permit the insertion of the securing element through the walls of the hook and through the flange.

In testimony that I claim the foregoing as my own, I have hereto affixed my signature in the presence of two witnesses.

JABEZ M. SMITH.

Witnesses:
Geo. W. Fowler,
E. R. Carver.

Copies of this patent may be obtained for five cents each, by addressing the "Commissioner of Patents, Washington, D. C."